April 8, 1952  O. V. PAGE  2,592,326
AUTOMATIC BRAKE ADJUSTING MEANS
Filed Dec. 24, 1946
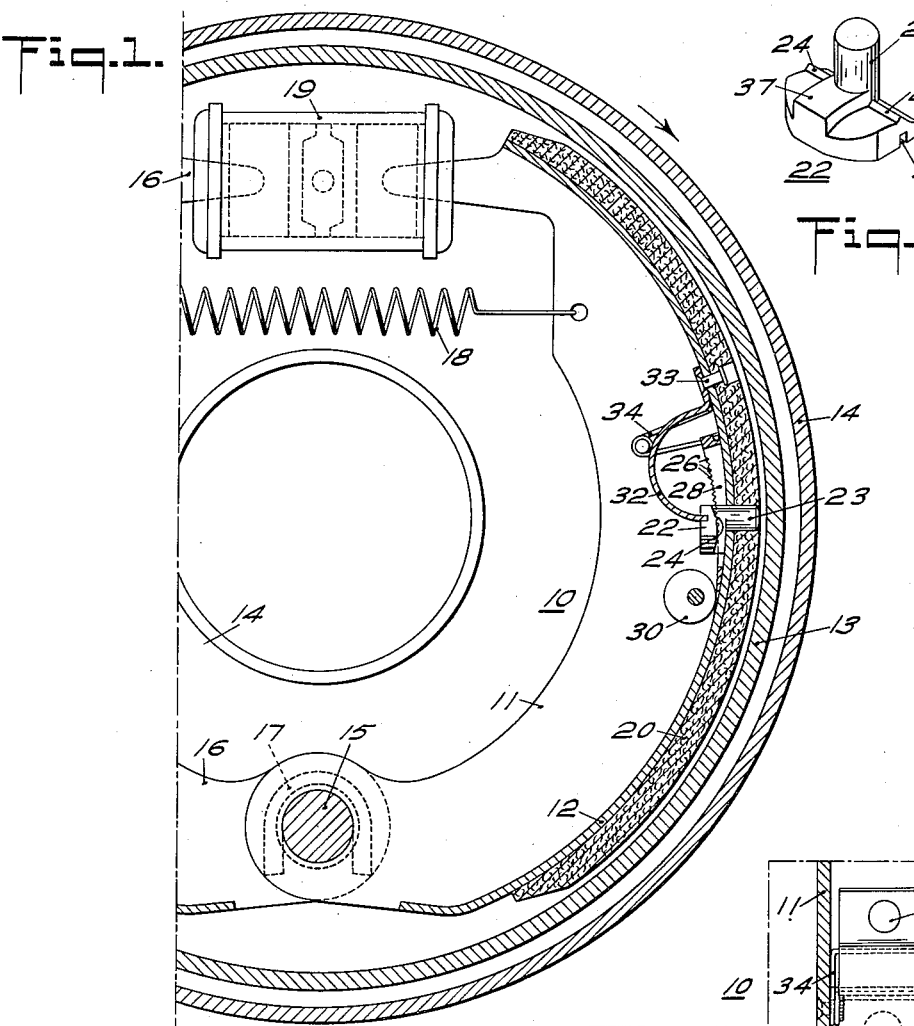
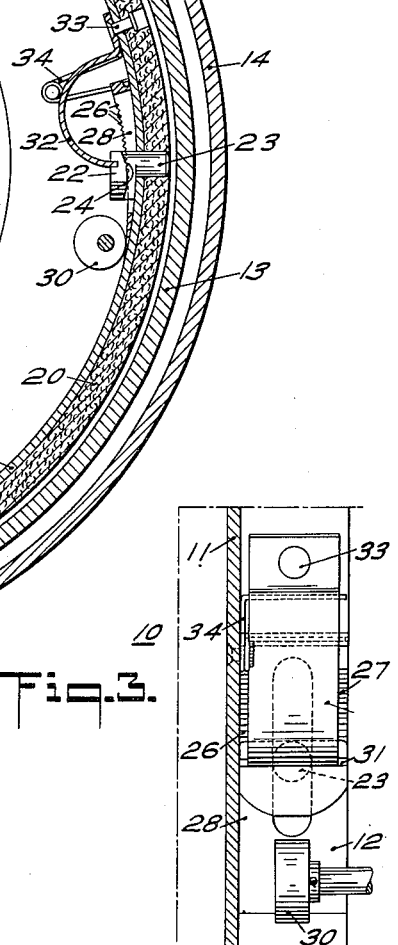
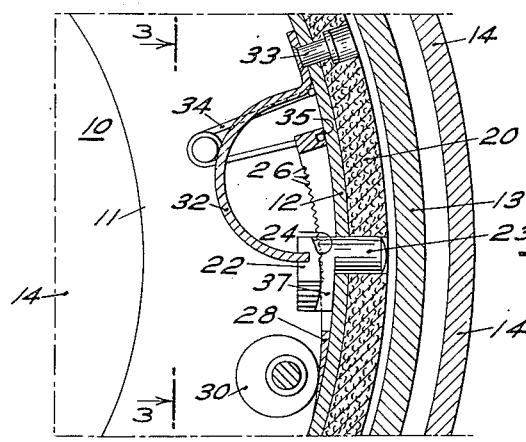
INVENTOR
OSWALD V. PAGE
BY Woodcock and Phelan
ATTORNEYS Patented Apr. 8, 1952

2,592,326

UNITED STATES PATENT OFFICE 2,592,326

AUTOMATIC BRAKE ADJUSTING MEANS

Oswald V. Page, Pottstown, Pa., assignor, by mesne assignments, to Neapco Products Inc., a corporation of Delaware Application December 24, 1946, Serial No. 718,246

5 Claims. (Cl. 188—79.5)

1

This invention relates to improved automatic adjusting means for a brake shoe, more particularly to an automatic brake adjusting device for automobile brakes, and has for an object the provision of a simple, inexpensive and highly reliable arrangement for automatically adjusting the brakes to compensate for wear of the brake lining.

While automatic brake adjusting devices have been heretofore proposed, they have left much to be desired due to their complexity, high initial cost, and because lacking in the reliability necessary to make them practical adjuncts to automobile brakes.

In carrying out the present invention in a preferred form thereof, a wedge is arranged to coact with a stationary member, such as the adjusting cam of the brake, and to be positioned between the cam and the brake shoe so as to predetermine and fix the brake shoe position to maintain a predetermined "off" position clearance between the brake lining and the drum. The wedge is provided with a central slot in which is disposed the shoulders of a member having an extension which protrudes through the flange of the brake shoe and through the brake lining to the outer surface thereof. This actuating member is provided with knife edges or teeth which cooperate with teeth or serrations on the upper surfaces or sides of the wedge along the slot. A spring tends to move the wedge to a greater extent beneath the adjusting cam. This movement occurs whenever the brake lining wears to an extent where the extending portion of the actuating member contacts the brake drum and is displaced thereby to releast the wedge. The wedge thereupon moves beneath the cam an amount to take up the additional clearance due to the wear of the brake shoe. A relatively wide spring fastened at one end to the brake shoe has its other end nesting in a wide slot of the actuating member to press it against the wedge and to prevent turning of the actuating member relative to the wedge.

For a more detailed explanation of the invention and for further objects and advantages thereof, reference is to be had to the accompanying drawing, in which:

Fig. 1 is a sectional elevation of a part of a brake assembly including the present invention;

Fig. 2 is an enlarged view of the automatic brake adjusting means;

Fig. 3 is an elevation of Fig. 2 taken on the line 3—3; and

Fig. 4 is a perspective view of the actuating member.

While the present invention may be readily applied to nearly all of the brakes of automobiles manufactured over a substantial period of time, it is particularly adapted to automobile

2 brakes which include an adjusting cam for regulating the off-position clearance of the brakes. More particularly, in Fig. 1, there has been shown by way of example the invention applied to a typical brake assembly which includes a brake shoe 10 comprising a web 11 and a lining-carrying flange 12 for cooperation with the inner surface of a brake drum 13. A closure member 14 for the brake drum is also illustrated. It is to be understood the brake drum 13 is attached to the wheel of the automobile or other vehicle. The lower or heel end of the brake shoe 10 is pivotally mounted on the backing plate or closure member 14 by means of an anchor pin 15. The companion brake shoe 16 also has its lower end pivoted on the anchor pin 15, a spring clip 17 straddling a notch in the anchor bolt to retain the brake shoes in position thereon.

The brake shoes 10 and 16 are shown in their "off" position, to which they are biased by a spring 18. They are actuated to the "on" or braking position by means of a fluid or hydraulic motor 19 which, of course, is energized by the brake pedal of the car, or otherwise. It will be observed that in the "off" position of the brakes, there is clearance between the brake lining 20 and the brake drum 13. Such clearance is essential to prevent drag of the brakes with consequent unnecessary loss of power and wear on the brake shoes.

Upon application of the brakes, the brake shoes 10 and 16 are moved by the motor 19 or equivalent into frictional engagement with the drum 13. As the brake lining 20 wears away, the motor 19 must move the brake shoes 10 and 16 increasingly greater distances for the same braking effort. When the wear has reached a certain point, the extent of depression of the brake pedal may not be adequate for operation of the motor 19 effectively to apply the brakes. The operator of the car, though he should keep his brakes adjusted to insure maximum safety in driving, frequently overlooks the needed servicing until he actually experiences a loss in the effectiveness of the brakes.

In accordance with the present invention, however, the brakes are automatically adjusted as the lining 20 wears away, by provision on one or both brake shoes of an actuator 22, Fig. 4, which includes an extension 23, preferably cylindrical, which extends through both the web 12 and the brake lining 20 to the outer surface thereof. The extension or operating portion 23 preferably forms an integral part of the body part on which are formed sharp-edged means, as two knife edges 24 and 25, which, respectively, engage transverse or laterally extending rows 26 and 27 of serrations formed on opposite sides of a wedge 28. The wedge itself is tapered to its relatively thick free end thereof from a thin or sharpened end thereof disposed beneath an adjusting cam 30 and between it and the flange 12. The body portion of the actuating member 22 is also provided with an elongated transverse recess 31 in which rests the wide end of a spring 32 which is anchored to the flange 12 as by one of the brake lining rivets 33. A coiled spring 34, of the mousetrap type, has one end resting beneath the stationary end of the spring 32, while the other end rests within a groove 35, Fig. 2, formed in the base of the wedge 28.

The wedge 28 is provided with a central slot extending from a point substantially removed from the cam 30 to a point adjacent the opposite end thereof, and the body portion of the member 22 is provided with a rectangular mid-portion 37 having flat sides or shoulders which serve to guide it and to minimize any twisting or turning of the transverse serrations 26 and 27 with respect to the knife edges 24 and 25. This is important since any twisting of the knife edges 24 and 25 with respect to the serrations 26 and 27 might release the wedge and thereby effect undesired adjustment of the brake. As constructed, however, the wedge is firmly retained in position until the brake lining 20 wears away an amount, which upon actuation of the brake, brings the end of the extension 23 against the inner face of the drum 13 to produce movement of the body portion against the bias of the spring 32 by an amount adequate to remove the knife edges 24 and 25 from particular serrations 26 and 27. When that occurs, the spring 34, aided by gravity, moves the wedge 28 the distance of one serration or more and until an additional serration engages the knife edges 24 and 25 to hold the wedge 28 in its new position. In this manner, the end of the wedge 28 between the cam 30 and the flange 12 gradually and effectively predetermines and maintains substantially constant the off-position clearance of the brake and effects an automatic adjustment which insures that upon every operation of the brake pedal throughout the life of the brakes, the original and maximum braking effort will not be diminished due to failure of proper brake adjustments.

It is to be understood that other forms of the invention may be made within the spirit and scope of the appended claims. For example, the extension 23 may be separate from the actuator 22. It may have one end arranged within a recess in actuator 22 where it is now integrally joined thereto. The spring 34 while not essential is preferred since more positive action is secured than with gravity alone. The adjusting device as a whole may be applied to both brake shoes though in general it need be applied only to the leading brake shoe, as shown, which is subject to the greater wear. The actuating member 22 is preferably made of bronze or other bearing material. The knife edges may be made of the same material or of hardened steel brazed to the body member or otherwise attached thereto as by a slot extending therethrough.

The device as a whole may form a component part of original equipment of an automobile or it may be added as an accessory. To add it to the brake shoe of an existing installation, only one brake-lining rivet need be replaced by the rivet 33 and only the one hole drilled for passage of the cylindrical extension 23 therethrough. After installation, the cam 30 need not be further adjusted. For cars not provided with cams, a stationary member may be secured in fixed position within the drum in the same manner as cam 30 or by direct threaded engagement with an adjacent stationary part. Finally, the spring 34 may be duplicated, Fig. 3, or subdivided, so that half of the coil thereof is on each side of the wedge 28 and each of the arms thereof is resting in slot 31 and under spring 32 or the double-coil spring may have the arms secured together, the arrangement providing greater equalization of the force of spring 34 in biasing the wedge toward the cam 30.

What is claimed is:

1. The combination with a brake shoe, a brake drum, and a normally stationary member within said drum, of means for adjusting the off-position clearance of a brake shoe and its lining within a brake drum and with respect to a cam within said drum comprising an elongated wedge disposed between said cam and said brake shoe, the thickness of said wedge gradually increasing from one end toward the opposite end thereof, and the thickness between said cam and said brake shoe predetermining the off-position clearance of said lining with respect to said drum, said wedge having an elongated slot and a series of serrations crosswise of said wedge, a wedge-control member having an elongated guiding surface slidably engaging an inner surface of said slot to prevent relative turning movement therebetween, said member having a sharp-edged means disposed in engagement with one of said serrations, said member having a transverse slot across the inner surface thereof, a relatively wide spring having one end disposed within said transverse slot for preventing turning of said member and of said wedge and for biasing said member against said wedge and said wedge against said brake shoe, said member having an actuating portion extending through said brake shoe and its lining and upon application of the brake shoe and after wear of the brake lining operable by engagement with said brake drum to disengage said sharp-edged means from said one serration for advance of said wedge between said cam and said brake shoe until engagement of said sharp-edged means by another serration of said wedge.

2. The combination with a brake shoe, a brake drum, and a normally stationary member within said drum, of means for adjusting the off-position clearance of a brake shoe and its lining within a brake drum comprising an elongated arcuate wedge initially disposed between said stationary member and said brake shoe with the thinner portion therebetween to determine the off-position clearance of said brake shoe, said wedge being of gradually increasing thickness, a spring acting in a direction to move said wedge farther between said brake shoe and said stationary member, said wedge having an elongated central slot and a series of serrations crosswise of said wedge, a wedge-control member having elongated flat guiding surfaces slidably engaging the inner surfaces of said slot to prevent relative turning movement between the wedge and its control member, said wedge-control member having knife edges disposed in engagement with at least one of said serrations, said control member having a relatively wide transverse slot along the upper surface thereof and at the end opposite that disposed between said stationary member and said brake shoe, a relatively wide spring of the cantilever type having one end nesting within said wide slot, means securing the opposite end of said cantilever spring to said brake shoe, said spring biasing said edges of said control member against said serrations, said control member having an actuating portion extending through said brake shoe and its lining and upon application of said brake shoe and after wear said brake lining operable by engagement with said brake drum to disengage said knife edges from said serrations for advance of said wedge between said stationary member and said brake shoe until engagement of said knife edges by at least one other serration on said wedge.

3. In a brake shoe adjusting mechanism, the sub-combination comprising a wedge having an elongated slot extending lengthwise thereof and a series of serrations crosswise thereof, a wedge-control member having an elongated guiding surface slidably engaging an inner surface of said slot to prevent relative turning movement therebetween, said member having a sharp-edged means disposed in engagement with one of said serrations, said member having a transverse slot extending generally parallel to said sharp-edged means, and a relatively wide spring having one end disposed to fit within said transverse slot to prevent turning of said member relative to said spring and for biasing said member against said wedge.

4. In a brake of the type including a brake shoe, a drum, and a normally stationary member within said drum, a brake-adjusting mechanism for adjusting the off-position clearance of said brake shoe and its lining with respect to said brake drum, comprising an elongated wedge disposed between said stationary member and said brake shoe, the thickness of said wedge therebetween predetermining the off-position clearance of said brake shoe, a spring acting in a direction to move said wedge farther between said brake shoe and said stationary member, said wedge having an elongated central slot and a series of serrations crosswise of said wedge, means for retaining said wedge in a predetermined position comprising an actuating member having at least one knife edge disposed for engagement with one of said serrations, said member also having a rectangular center part disposed in guiding relation in said slot, and an extension of length for extension through said brake shoe and its lining for operation upon wear of the brake lining by engagement with said brake drum to disengage said knife edge from said one serration for advance of said wedge between said stationary member and said brake shoe until engagement of said knife edge by another serration on said wedge.

5. In a brake of the type including a brake shoe having a lining, a drum and a normally stationary member within said drum, a brake-actuating mechanism for adjusting the off-position clearance of said brake shoe and its lining within said brake drum and relative to said stationary member comprising an elongated arcuate wedge initially disposed between said stationary member and said brake shoe with the thinner portion therebetween predetermining the off-position clearance of said brake shoe, said wedge being of gradually increasing thickness, a spring acting in a direction to move said wedge farther between said brake shoe and said stationary member, said wedge having an elongated slot and a series of serrations crosswise of said wedge, a wedge-control member having flat guiding surfaces for slidably engaging an inner surface of said slot to prevent relative turning movement therebetween, said member having a sharp-edged means disposed in engagement with one of said serrations, and said member having an actuating portion of length adequate to extend through said brake shoe and its lining and operable upon application of said brake shoe and after wear of its brake lining and by engagement with said brake drum to disengage said sharp-edged means from said one serration for advance of said wedge between said stationary member and said brake shoe until engagement of said sharp-edged means by another serration on said wedge.

OSWALD V. PAGE.

REFERENCES CITED

The following references are of record in the file of this patent:

UNITED STATES PATENTS

| Number | Name | Date |
| --- | --- | --- |
| 2,117,288 | Bulcher | May 17, 1938 |
| 2,157,272 | Sneed | May 9, 1939 |
| 2,202,842 | Dick | June 4, 1940 |
| 2,229,919 | Dimont | Jan. 28, 1941 |
| 2,322,492 | Williams | June 22, 1943 |
| 2,400,468 | Sacher | May 14, 1946 |